United States Patent [19]

Haner

[11] 4,358,724

[45] Nov. 9, 1982

[54] SOLID STATE SERVO AMPLIFIER FOR A D.C. MOTOR POSITION CONTROL SYSTEM

[75] Inventor: Lambert Haner, Rocky River, Ohio

[73] Assignee: Commercial Shearing, Inc., Youngstown, Ohio

[21] Appl. No.: 213,748

[22] Filed: Dec. 8, 1980

[51] Int. Cl.³ .............................................. G05F 1/08
[52] U.S. Cl. .................................... 318/681; 318/678; 330/1 R
[58] Field of Search ................ 330/1 R; 318/678, 681

[56] References Cited

U.S. PATENT DOCUMENTS

| | | | |
|---|---|---|---|
| 3,652,913 | 3/1972 | Leland | 318/681 X |
| 4,063,142 | 12/1977 | Sieber et al. | 318/678 |
| 4,066,945 | 1/1978 | Korte, Jr. | 318/681 |

Primary Examiner—B. Dobeck
Attorney, Agent, or Firm—Buell, Blenko, Ziesenheim & Beck

[57] ABSTRACT

A linear solid state servo amplifier operated from a low voltage source and which develops a voltage across the servo motor equal to the source voltage diminished only by the saturation voltages of two of its output transistors has a bridge output stage of complementary transistors and a bridge driver stage of complementary Darlington transistors having as its load a preselected resistor.

3 Claims, 1 Drawing Figure

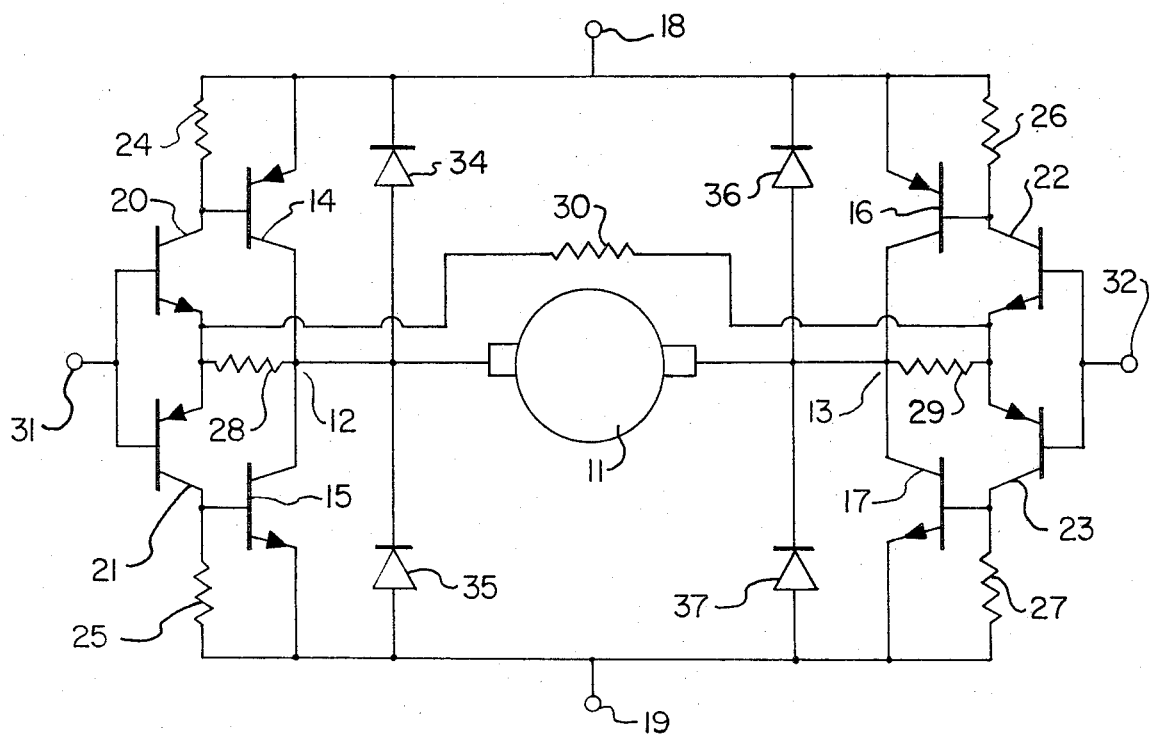

SOLID STATE SERVO AMPLIFIER FOR A D.C. MOTOR POSITION CONTROL SYSTEM

This invention relates to solid state servo amplifiers for a D.C. motor position control system and particularly to such a system operating from a low voltage D.C. powered bus such as a 12 volt battery powered bus.

There has long been a need for a servo amplifier which could be produced at low cost, yet have high accuracy and high current output from a low voltage D.C. power source. Among the uses for such a servo are proportional electric remote control systems for hydraulic and other systems.

In the apparatus of this invention a D.C. motor is a torque generating device in which motor torque is proportional to the electric current flowing in the motor. The direction of the torque is developed in both clockwise and counterclockwise directions by controlling the motor current so as to flow in either direction in the armature circuit. One conventional way that this has been accomplished in the prior art has been to construct the power stage in the form of a power bridge using a Darlington transistor configuration. In this configuration, current is made to flow into one terminal of the motor and out of the opposite motor terminal by making the input terminal on one side more positive than the input terminal on the opposite side. Current direction can be reversed in the motor by making said opposite side more positive. The maximum voltage that can be developed across the motor terminals by causing one pair of the Darlington legs to saturate is about 8.8 volts. Using a 12 volt source, the maximum voltage that can be achieved is about 6 volts across the motor. This is about 50% drive efficiency and limits the maximum peak torque which can be developed by the motor. In order to reduce the voltage drop across the motor it has been proposed to design a pulse width modulated switching type of power amplifier using power transistors (not Darlington). By proper design it is possible to develop as much as 11 volts across the motor using a 12 volt source. However, the pulse width modulated arrangement has numerous drawback. First, the control amplifier is more complex and expensive. Second there are undesirable performance "side effects" due to the switching nature of the amplifier which prove undesirable. Experience has shown that a linear type of amplifier with a low saturation voltage would be desirable for the systems contemplated. No such device has been available prior to the present invention.

The present invention provides a novel power amplifier which is inexpensive, highly efficient and provides sufficient power to operate control motors both rapidly and accurately.

I provide a linear type amplifier circuit in the form of an output transistor bridge having an output connected to a servo motor for delivering power to said motor, a complementary bridge of Darlington transistors in series with said output transistor bridge and having as its load a preselected resistor, the output from the Darlington bridge and load resistance being connected to the input of the transistor bridge.

An embodiment of my invention presently preferred by me is shown in the attached FIGURE.

In the FIGURE servo motor 11 is connected between terminals 12 and 13 of an output bridge comprising pnp transistors 14 and 16, each pnp transistor series connected with npn transistors 15 and 17 respectively, the two series strings being paralleled. Servo motor 11 forms one diagonal of that bridge. The emitters of transistors 14 and 16 are connected to terminal 18 and the emitters of transistors 15 and 17 are connected to terminal 19. The power supply for the transistors is connected between terminals 18 and 19 and forms the other diagonal of the bridge. The transistors of the output bridge are driven each by its complementary driver transistor, those driver transistors themselves forming a bridge. The collectors of driver transistors 20 and 22 are connected to terminal 18 through resistors 24 and 26 respectively. The collectors of driver transistors 21 and 23 are connected to terminal 19 through resistors 25 and 27 respectively. The emitters of transistors 20 and 21 are connected together and to terminal 12 through resistor 28. The emitters of transistors 22 and 23 are connected together and to terminal 13 through resistor 29. The emitters of transistors 20 and 21 are connected to one end of a load resistor 30 the other end of which is connected to the emitters of transistors 22 and 23. The bases of output transistors 14, 15, 16 and 17 are connected to the collectors of driver transistors 20, 21, 22 and 23 respectively. The bases of driver transistors 20 and 21 are connected together at terminal 31 and the bases of driver transistors 22 and 23 are connected together at terminal 32. Diodes 34 and 36 are connected between terminal 18 and terminals 12 and 13 respectively and diodes 35 and 37 are connected between terminal 19 and terminals 12 and 13 respectively.

Operation

The torque of servo motor 11 is proportional to the current flowing therethrough. The direction of rotation of servo motor 11 depends on the direction of that current. When the control voltage at terminal 31 is positive with respect to terminal 32 the motor 11 rotates in one direction and when the control voltage at terminal 32 is positive with respect to terminal 31 motor 11 rotates in the opposite direction.

My amplifier is designed to obtain higher torque from motor 11 at a low operating voltage between terminals 18 and 19, such as a 12 volt battery or bus. A typical servo motor for such a voltage has a resistance between terminals of about 1.12 ohms. Therefore the maximum motor current is 10 amps. The minimum specified current gain through transistors 14, 15, 16 and 17 with 10 amperes of collector current is 15. This means that the maximum base current required to supply 10 amperes into the motor is 0.67 amperes. I have found that the optimum value for resistor 30 when used with the circuit components set out in the table is 7.5 ohms. The maximum voltage drop across resistor 30 is therefore 7.5×0.67 or 5 volts. Subtracting that voltage from the supply voltage of 12 volts leaves 7 volts to overcome the voltage drops of the output transistors. The collector-to-emitter saturation voltage of each output transistor is 0.50 volts, which leaves 11 volts across servo motor 11.

The base-to-emitter saturation voltage of the output transistors is 1 volt each, and if those voltages, together with the 5 volt drop across resistor 30 are subtracted from the 12 volt supply, 5 volts are left for the collector-emitter voltages of the driver transistors or 2.5 volts each. The saturation voltage of each driver transistor is 1.5 volts, therefore 1 volt remains in the linear region of each. The base-to-emitter voltage drop in each driver is 2.5 volts. The voltage between terminals 31 and 32 is 10 volts. The minimum current gain specified for the driver transistors is 10,000, therefore the maximum base current required to produce a collector current of 0.67 amperes is 67 microamperes.

A suitable operational amplifier to drive terminals 31 and 32, such as the LM 324, manufactured by National Semiconductor or Motorola, can provide an output source current of up to 5,000 microamperes at terminal 31 with a voltage drop from supply voltage of 1.2 volts. It can provide an output current sink of as much as 1,000 microamperes with a voltage above ground of 0.5 volts at terminal 32. Hence, from a 12 volt supply, subtracting 1.2+0.5 volts, leaves 10.3 volts available from the operational amplifier to drive across terminals 31 and 32.

Resistors 28 and 29 respectively are required to provide voltage feedback from the collectors of output transistors 14 and 15 to the bases of driver transistors 20 and 21, and from the collectors of output transistors 16 and 17 to the bases of driver transistors 22 and 23. The values of those resistors cannot be zero because then the base voltage of driver transistors 20 and 21 would be forced to follow the collector voltages of output transistors 14 and 15, and those transistors could never be driven into saturation because the collector-emitter voltage drop of 0.5 volts would be less than the combined base-emitter drop of 1 volt plus the collector-emitter drop of 1.5 volts at saturation of the driver transistor. I find that the optimum values of resistors 28 and 29 for the conditions mentioned is about 50 ohms each.

COMPONENT TABLE

| Reference Character | Device | Designation | Manufacturer |
|---|---|---|---|
| 24, 25, 26, 27, 28, 29 | resistor | 51 Ohms | |
| 30 | resistor | 7.5 Ohms, 12 watts | |
| 14, 16 | pnp output transistor | 2N4398 | Motorola |
| 15, 17 | npn-output transistor | 2N5310 | Motorola |
| 20, 22 | npn - Darlington Driver transistor | D40K1 | Motorola, GE |
| 21, 23 | pnp Darlington Driver transistor | D41K1 | Motorola, GE |
| 34, 35, 36, 37 | Diode | MR500 | Motorola |
| 11 | Servo motor | 13000 | Pittman |

Resistors 24, 25, 26 and 27 are effectively the base return resistors for output transistors 14, 15, 16 and 17 respectively. The base-to-emitter resistance should be as low as possible in order to minimize the collector-to-emitter leakage current at elevated junction temperatures and small enough to insure that the maximum collector leakage current of driver transistors 20, 21, 22 and 23 respectively does not flow into the base of the output transistor associated with each one. That maximum leakage current from the driver transistors listed in the table is specified as 20 microamperes and this current causes a voltage drop of about one millivolt across a resistor of 51 ohms, which is a suitable value for resistors 24, 25, 26 and 27. That voltage is insufficient to overcome the base-to-emitter cutoff voltage of the output transistors.

Diodes 34, 35, 36 and 37 serve to protect the output transistors from reverse voltages that may be generated by the inductance of the armature of motor 11 when the control acts to cause a rapid change in motor current.

The principal advantages of my amplifier are that it is linear, that is to say non-switching, that it operates from a single low voltage power supply, and that it delivers to the load the supply voltage diminished only by the saturation voltages of two of its output transistors.

In the foregoing specification, I have described presently preferred embodiments of my invention; however, it will be understood that my invention can be otherwise embodied within the scope of the following claims.

I claim:

1. A servo motor amplifier comprising an output bridge of complementary output transistors driven respectively by a bridge of complementary driver transistors each connected to a separate collector resistor, the other ends of each of those collector resistors being connected to the emitter of its associated output transistor, the diagonal of the output bridge between collectors of each pair of complementary output transistors constituting the bridge output, a separate connection between the base of each output transistor and the collector of its associated driver transistor, a load resistor connected across the diagonal of the driver bridge between the junction of the emitters of each pair of complementary driver transistors, a separate feedback resistor connected between the junction of the emitters of each pair of complementary driver transistors and the junction of the collectors of their associated output transistors, means for connecting a direct current power supply across the other diagonal of the output bridge, and means for connecting an input between the connected bases of each pair of complementary driver transistors.

2. The amplifier of claim 1 in combination with a servo motor, the resistance of the load resistor being greater than the direct current resistance of the servo motor.

3. The amplifier of claim 1 in which the resistance of each feedback resistor is adjusted so that the voltage drop thereacross is greater than the emitter-to-collector saturation voltage of an output transistor.

* * * * *